United States Patent
Lemons

(10) Patent No.: US 6,497,068 B1
(45) Date of Patent: Dec. 24, 2002

(54) AUTOMATIC FISHHOOK

(76) Inventor: John D. Lemons, 10 W. Cedarwood Dr., Muncie, IN (US) 47303

( * ) Notice: Subject to any disclaimer, the term of this patent is extended or adjusted under 35 U.S.C. 154(b) by 0 days.

(21) Appl. No.: 10/077,115

(22) Filed: Feb. 19, 2002

(51) Int. Cl.[7] .............................................. A01K 83/02
(52) U.S. Cl. ...................................................... 43/36
(58) Field of Search ................................ 43/36, 34, 35

(56) References Cited

U.S. PATENT DOCUMENTS

| | | | | |
|---|---|---|---|---|
| 243,622 A | * | 6/1881 | Rentz et al. ............... | 43/36 |
| 618,764 A | * | 1/1899 | Anderson ..................... | 43/36 |
| 807,514 A | * | 12/1905 | Stockwell ..................... | 43/36 |
| 1,649,140 A | * | 11/1927 | Steffens ...................... | 43/36 |
| 2,004,316 A | * | 6/1935 | Foote ............................ | 43/36 |
| 2,148,074 A | * | 2/1939 | Kaspick ........................ | 43/36 |
| 2,284,034 A | * | 5/1942 | Binkowski .................... | 43/36 |
| 2,449,045 A | * | 9/1948 | Athans ......................... | 43/36 |
| 2,781,605 A | | 2/1957 | Eilermann ................. | 43/44.2 |
| 2,790,264 A | | 4/1957 | Rickard ..................... | 43/42.5 |
| 3,222,814 A | | 12/1965 | Rossnan ....................... | 43/36 |
| 3,492,752 A | * | 2/1970 | Viveiros ....................... | 43/36 |
| 3,975,856 A | * | 8/1976 | Gadbois ........................ | 43/36 |
| 4,104,820 A | * | 8/1978 | Bardebes ...................... | 43/36 |
| 4,387,528 A | * | 6/1983 | Kahl ............................. | 43/36 |
| 4,446,647 A | * | 5/1984 | Kahl ............................. | 43/36 |
| 4,616,439 A | * | 10/1986 | Lee ............................... | 43/36 |
| 4,726,142 A | * | 2/1988 | Tapley .......................... | 43/36 |
| 4,774,784 A | * | 10/1988 | Lee ............................... | 43/36 |
| 4,934,092 A | * | 6/1990 | Simmons et al. ............. | 43/36 |
| 4,947,574 A | * | 8/1990 | Tapley .......................... | 43/36 |
| 4,980,987 A | | 1/1991 | Ramsey, Sr. ................. | 43/34 |
| 4,987,695 A | | 1/1991 | Preiser ..................... | 43/42.41 |
| 5,009,026 A | | 4/1991 | Corbitt, III ................ | 43/44.8 |
| 5,035,076 A | * | 7/1991 | Martin ......................... | 43/36 |

FOREIGN PATENT DOCUMENTS

| | | | | |
|---|---|---|---|---|
| GB | 1514996 B1 | * | 6/1978 | |
| IT | 447527 B1 | * | 4/1949 | 43/36 |
| JP | 2-124048 B1 | * | 5/1990 | |

* cited by examiner

*Primary Examiner*—Darren W. Ark
(74) *Attorney, Agent, or Firm*—Donald R. Schoonover

(57) ABSTRACT

A fishhook includes a one-piece monolithic body having two legs that have barbs on the ends thereof and are biased so the barbs move in a common plane while retaining a common orientation with respect to each other. A notch portion on one of two legs abuts a notch portion on the other leg to hold the hook in an armed configuration by abutting engagement and is moved out of abutting engagement to permit a torsion spring to move the legs apart into a triggered configuration.

2 Claims, 2 Drawing Sheets

AUTOMATIC FISHHOOK

BACKGROUND OF THE INVENTION

1. Field of the Invention

The present invention relates to the general art of fishing, and to the particular field of hooks and lures.

2. Discussion of the Related Art

Fishing is an extremely popular sport and pastime. As such, and due to its increasing popularity, the fishing art has undergone a concomitant increase in size and variety. Many problems encountered by fishermen are approached by the inventions in this varied art. Inventions directed to winding fishing line, inventions directed to night fishing, to ice fishing, to deep sea fishing and the like have been proposed.

One area of particular interest includes fishing hooks and lures. The inventions in this subclass of the fishing art are as varied as in any other area of the art. These inventions include hooks that are designed for safety, lures that are designed to attract fish, hooks that are designed to be easily retrieved and the like.

However, due to the increasing popularity of fishing, there is always a need for improvements. This includes the area of fishing hooks and lures as well.

Therefore, there is a need for an improved fishing hook.

One problem encountered by all fishermen is in properly setting a hook after a fish strikes the hook. The strike must be communicated from the hook through the line to the fishing rod and then to the fisherman. All of this takes time and then the rod must be moved to set the hook at just the right time. Even experienced fisherman often miss a fish due to this portion of the process. However, inexperienced fishermen suffer most from errors in setting the hook after a strike.

Therefore, there is a need for a fishing hook that can effectively and reliably be set after a strike.

The art contains several examples of fishing hooks that automatically set after a fish strikes. However, these known hooks are generally complex, and often contain several parts that must each work properly for the hook to be effective. Since a fish hook is used in difficult and harsh environments, the many moving and co-operating parts of known automatic fish hooks are prone to failure. This makes such automatic fish hooks unreliable, or worse, inoperative. Having an unreliable or inoperative fish hook may be worse than not having any hook at all because the fisherman will depend on the proper operation of the automatic fish hook and certainly miss a fish when the hook operates either incorrectly or not at all.

Therefore, there is a need for an automatic fish hook that is reliable.

PRINCIPAL OBJECTS OF THE INVENTION

It is a main object of the present invention to provide an improved fishing hook.

It is another object of the present invention to provide a fishing hook that can effectively and reliably be set after a strike.

It is another object of the present invention to provide an automatic fish hook that is reliable.

SUMMARY OF THE INVENTION

These, and other, objects are achieved by a fishhook which comprises a one-piece monolithic body which includes first and second legs, a barb on a distal end of each of the first and second legs, a torsion spring connecting a proximal end of the first leg to a proximal end of the second leg, the torsion spring biasing the proximal end of the first leg toward the proximal end of the second leg in an armed configuration of the one-piece monolithic body and biasing the proximal end of the first leg away from the proximal end of the second leg in a triggered configuration of the one-piece monolithic body, a notch portion in the first leg, a notch portion in the second leg, the notch portion in the first leg abutting the notch portion in the second leg when the one-piece monolithic body is in an armed configuration and being spaced apart from the notch portion in the second leg when the one-piece monolithic body is in a triggered configuration, and the barbs face away from each other and move in a common plane when the one-piece triggered configuration.

The fishhook of the present invention is a one-piece monolithic construction so it can easily resist the harsh environment in which it operates and the notches and barbs reliably operate.

DETAILED DESCRIPTION OF THE INVENTION

Figure 1:
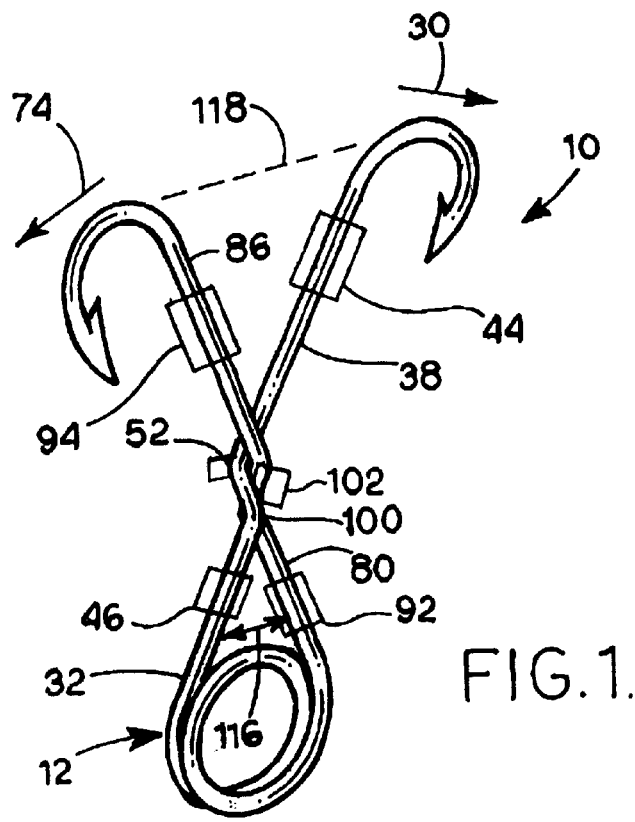
FIG. 1 is a perspective view showing the automatic fishing hook embodying the present invention in an armed configuration.

Other objects, features and advantages of the invention will become apparent from a consideration of the following detailed description and the accompanying drawings.

Referring to FIGS. 1–5, it can be seen that the invention is embodied in an automatic fishhook 10 comprising a one-piece monolithic body 12. The one-piece monolithic nature of body 12 ensures that fishhook 10 will not require a plurality of interengaging elements that may become damaged or non-functional due to the difficult environment in which fishhook 10 will be used. Body 12 includes a first leg 14 having a body 16 which includes a proximal end 18, a distal end 20, and an axial dimension 22 extending between proximal end 18 and distal end 20. A ninety-degree loop portion 24 is located on distal end 20 of first leg 14 and includes a free end 26, and a barb 28 on free end 26 of ninety-degree loop portion 24 of first leg 14. Free end 26 of first leg 14 is spaced from body 16 of first leg 14 and ninety-degree loop portion 24 of first leg 14 extends away from body 16 of first leg 14 in a first direction 30.

Body 16 of first leg 14 further includes a proximal section 32 located adjacent to proximal end 18 of body 16 of first leg 14 and includes a distal end 34 and a proximal end 36 coincident with proximal end 18 of body 16 of first leg, 14. Body 16 of first leg 14 further includes a distal section 38 located adjacent to distal end 20 of body 16 of first leg 14 and includes a distal end 40 which is coincident with distal end 20 of body 16 of first leg 14 and a proximal end 42 located near distal end 34 of proximal section 32 of body 16 of first leg 14. Distal section 38 of body 16 of first leg 14 is located in a distal plane 44. Proximal section 32 of body 16 is located in a proximal plane 46. Free end 26 of ninety-degree loop portion 24 of body 16 is located in distal plane 44 of first leg 14.

Body 16 of first leg 14 further includes a notch portion 50 connecting proximal end 42 of distal section 38 to distal end 34 of proximal section 32. Notch portion 50 is in a notch plane 52 which is oriented at an oblique angle with respect to proximal and distal planes 46 and 44 respectively of first leg 14.

One-piece monolithic body 12 further includes a second leg 60 which is identical to first leg 14 and includes a body 62 which includes a proximal end 64, a distal end 66, an axial dimension 68 extending between proximal end 64 of body 62 of second leg 60 and distal end 66 of body 62. A ninety-degree loop portion 69 is located on the distal end 66 of the body 62 of second leg 60 and includes a free end 70, and a barb 72 on the free end 70 of the ninety-degree loop portion 69 of body 62. Free end 70 of body 62 is spaced from body 62 of second leg 60, and ninety-degree loop portion 69 extends away from the body 62 of the second leg. 60 in a second direction 74 with first direction 30 of first leg 14 being 180° from second direction 74 of second leg 60.

Body 62 of second leg 60 further includes a proximal section 80 located adjacent to proximal end 64 of body 62. Proximal section 80 includes a distal end 82 and a proximal end 84 which is coincident with proximal end 64 of body 62. Body 62 further includes a distal section 86 which is located adjacent to the distal end 66 of body 62 and which includes a distal end 88 which is coincident with the distal end 66 of body 62 and a proximal end 90 located near distal end 82 of proximal section 80. Proximal section 80 is located in a proximal plane 92 of second leg 60 and distal section 86 of body 62 is located in a distal plane 94 of second leg 60..

Free end 70 of the ninety-degree loop portion 69 of second leg 60 is located in distal plane 94 and distal plane 44 of first leg 14 is co-planar with distal plane 94 of second leg 60 with free end 26 of first leg 14 being co-planar with free end 70 of second leg 60 whereby movements 30 and 74 are co-planar.

Body 62 of second leg 60 further includes a notch portion 100 connecting proximal end 90 of distal section 86 to the distal end 82 of proximal section 80. Notch portion 100 is located in a notch plane 102 which is oriented at an oblique angle with respect to proximal and distal planes 92 and 94 respectively.

One-piece monolithic body 12 further includes a torsion spring 110 connecting proximal end 18 of body 16 of first leg 14 to proximal end 64 of body 62 of second leg 60 and includes a heat treated coil 112 which biases proximal end 18 toward proximal end 64 in an armed configuration of one-piece monolithic body 12 as shown in FIG. 1. Torsion spring 110 is formed of water-resistant material and is co-planar with proximal planes 46 and 92 of the first and second legs 14 and 60. Spring 110 maintains legs 14 and 60 near each other and operates reliably even in the harsh environments in which fishhook 10 operates.

Figure 3:
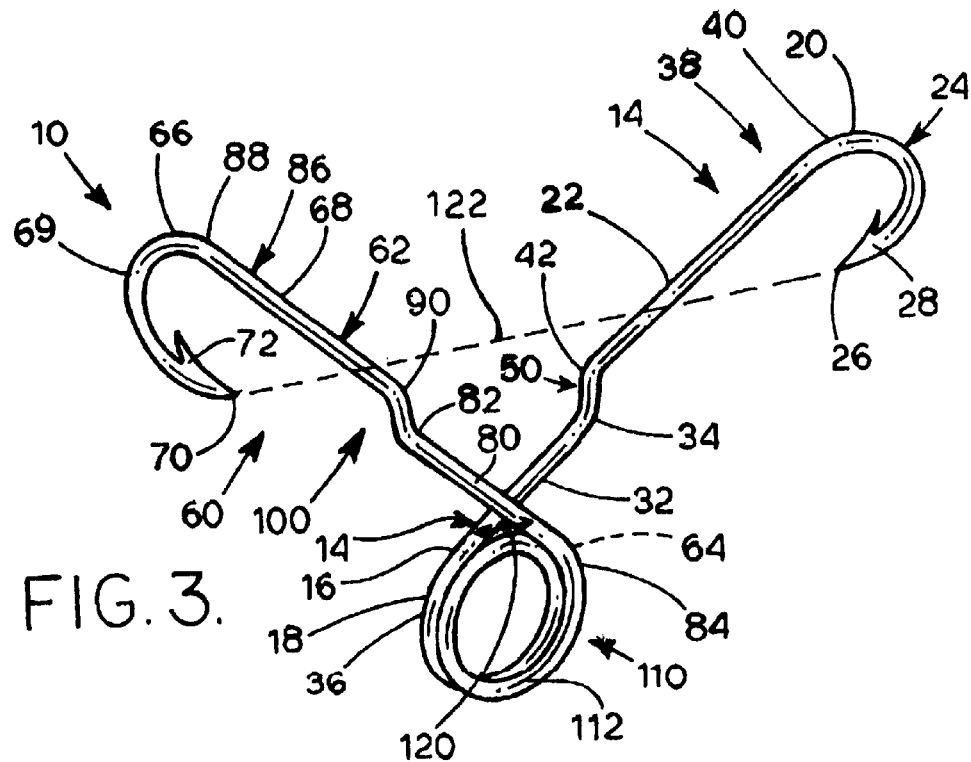
FIG. 3 is a perspective showing the automatic fishing hook embodying the present invention in a triggered configuration.
Figure 2:
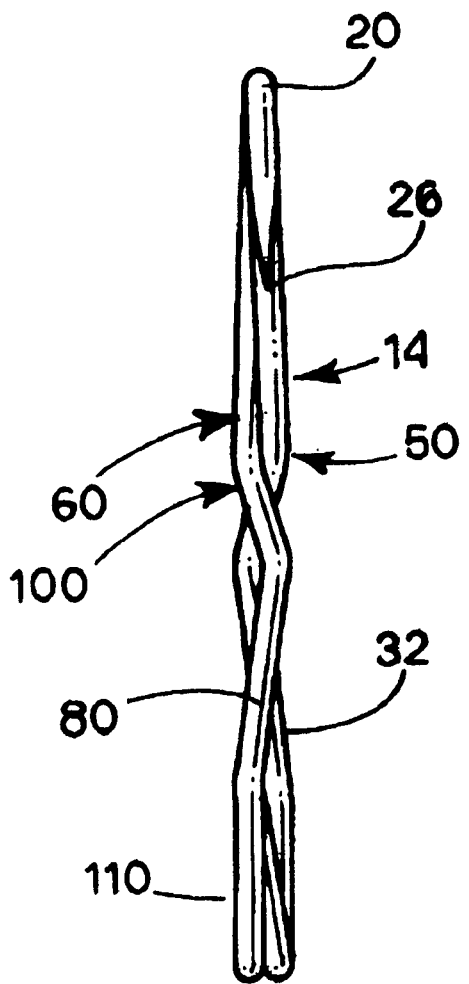
FIG. 2 is an elevational view of the fishing hook of the present invention in the armed configuration.
Figure 4:
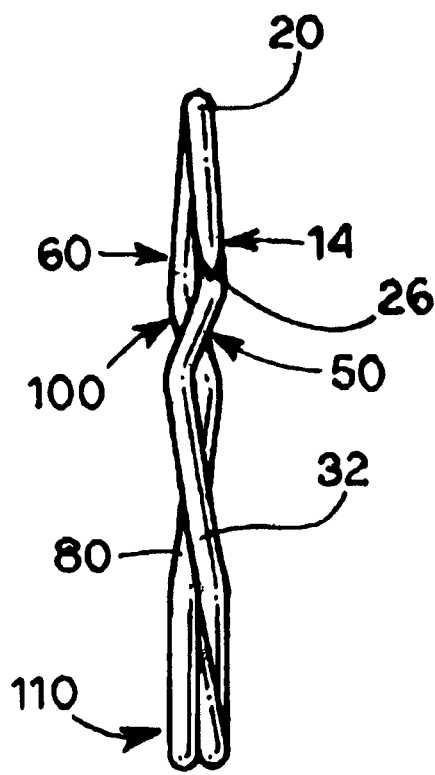
FIG. 4 is an elevational view of the fishing hook of the present invention in the triggered configuration.
Figure 5:
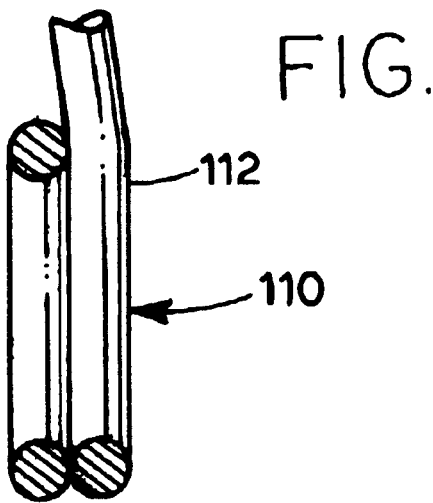
FIG. 5 is an elevational view of a heat treated control spring used to control movement of the legs of the automatic fish hook of the present invention.

As shown in FIG. 1, notch section 50 of body 16 of first leg 13 is located to abuttingly engage notch section 100 of body 62 of second leg 60 in the armed configuration shown in FIG. 1 of one-piece monolithic body 12 and is spaced apart from notch section 100 of body 62 of second leg 60 in a triggered configuration as shown in FIG. 3 of one-piece monolithic body 12. The notch section 50 of first leg 13 abuts the notch section 100 of second leg 60 in a plane which is transverse to a plane in which the torsion spring extends.

As can be understood from FIGS. 1 and 3, ninety-degree loop section 24 of first leg 14 and ninety-degree loop section 69 of second leg 60 are movable in distal planes 44 and 94 respectively of first and second legs 14 and 60 from the armed configuration shown in FIG. 1 with proximal end 36 of proximal section 32 of body 16 of first leg 14 spaced apart from proximal end 84 of proximal section 80 of second leg 60 by an armed space 116 and ninety-degree loop section 24 of first leg 14 curves away from ninety-degree loop section 69 of second leg 60, and barb 26 on first leg 24 is spaced apart from barb 72 on second leg 60 by an armed spacing 118 to the triggered configuration shown in FIG. 3 of one-piece monolithic body 12, with proximal end 36 of proximal section 32 of body 16 of first leg 14 spaced leg 60 by a triggered space 120. Triggered space 120 is shorter than armed space 116. Barb 28 on first leg 14 is spaced apart from barb 72 on second leg 60 by a triggered spacing 122 with the triggered spacing 122 between the barb 28 on the first leg 14 and the barb 72 on the second leg 60 being greater than the armed spacing 118 between the barb 28 on the first leg 14 and the barb 72 on the second leg 60 with the ninety-degree loop section 24 on the first leg 14 curving away from the ninety-degree loop section 69 on the second leg 60. The axes of the proximal section 32 of first leg 14 and the proximal section 80 of second leg 60 cross each other at first and second locations when they are in the armed and triggered configurations respectively, wherein the second location is closer to the torsion spring than the first location.

As can be understood from FIG. 1, one-piece monolithic body 12 is held in the FIG. 1 armed configuration against bias of coil 112 of torsion spring 110 by the abutting engagement between notch portion 50 on body 16 of first leg 14 and notch portion 100 on body 62 of second leg 60 and moving from the FIG. 1 armed configuration to the FIG. 3 triggered configuration after the notch portion 50 on the body 16 of the first leg 14 is moved out of the abutting contact with the notch portion 100 on the body 62 of the second leg 60 and under the influence of the coil of torsion spring 110.

It is understood that while certain forms of the present invention have been illustrated and described herein, it is not to be limited to the specific forms or arrangements of parts described and shown.

I claim:

1. A fishhook comprising:

a one-piece monolithic body which includes a) first and second legs, each having a distal end, a distal portion, a proximal portion, and a proximal end;

b) a barb on said distal end of each of said first and second legs;

c) a torsion spring connecting said proximal end of said first leg to said proximal end of said second leg;

d) said torsion spring biasing the proximal end of said first leg toward the proximal end of said second leg in an armed configuration of said one-piece monolithic body such that the axes of the proximal portions of said first and second leas cross each other at a first location, and wherein the axes of the proximal portions of said first and second legs cross each other at a second location which is closer to the torsion spring than the first location in a triggered configuration of said one-piece monolithic body;

e) a notch portion in said first leg which is oriented at an oblique angle with respect to the distal and proximal portions of the first leg;

f) a notch portion in said second leg which is oriented at an oblique angle with respect to the distal and proximal portions of the second leg;

g) said notch portion in said first leg abutting said notch portion in said second leg along a plane which is transverse to a plane in which the torsion spring extends when said one-piece monolithic body is in an armed configuration and being spaced apart from said notch portion in said second leg when said one-piece monolithic body is in a triggered configuration; and h) said distal ends of said first and second legs curving away from each other and moving in a common plane when said one-piece monolithic body moves from the armed configuration to the trigged configuration.

2. An automatic fishhook comprising:

a one-piece monolithic body having a) a first leg having a body which includes
  (1) a proximal end,
  (2) a distal end,
  (3) an axial dimension extending between the proximal end and the distal end,
  (4) a ninety-degree loop portion on the distal end of said first leg and which includes
    (A) a free end,
    (B) a barb on the free end of the ninety-degree loop portion of said first leg,
    (C) the free end of said first leg being spaced from the body of said first leg, and
    (D) the ninety-degree loop portion of said first leg extending away from the body of said first leg in a first direction,
  (5) a proximal section of the body of said first leg which is located adjacent to the proximal end of the body of said first leg and which includes
    (A) a distal end, and
    (B) a proximal end coincident with the proximal end of the body of said first leg,
  (6) a distal section of the body of said first leg which is located adjacent to the distal end of the body of said first, leg and which includes
    (A) a distal end which is coincident with the distal end of the body of said first leg, and
    (B) a proximal end located near the distal end of the proximal section of the body of said first leg,
  (7) the distal section of the body of said first leg being located in a distal plane,
  (8) the proximal section of the body of said first leg being located in a proximal plane,
  (9) the free end of the ninety-degree loop portion of the body of said first leg being located in the distal plane of said first leg,
  (10) a notch portion connecting the proximal end of the distal section of the body of said first leg to the distal end of the proximal section of the body of said first leg, and
  (11) the notch portion being in a notch plane which is oriented at an oblique angle with respect to the proximal and distal planes of said first leg;

b) a second leg having a body which includes
  (1) a proximal end,
  (2) a distal end,
  (3) an axial dimension extending between the proximal end of the body of said second leg and the distal end of the body of said second leg,
  (4) a ninety-degree loop portion on the distal end of the body of said second leg and which includes
    (A) a free end,
    (B) a barb on the free end of the ninety-degree loop portion of the body of said second leg,
    (C) the free end of the body of said second leg being spaced from the body of said second leg, and
    (D) the ninety-degree loop portion of said second leg extending away from the body of said second leg in a second direction,
  (5) the first direction of said first leg being approximately 180 degrees from the second direction of said second leg,
  (6) a proximal section of the body of said second leg which is located adjacent to the proximal end of the body of said second leg and which includes
    (A) a distal end, and
    (B) a proximal end coincident with the proximal end of the body of said second leg,
  (7) a distal section of the body of said second leg which is located adjacent to the distal end of the body of said second leg and which includes
    (A) a distal end which is coincident with the distal end of the body of said second leg, and
    (B) a proximal end located near the distal end of the proximal section of the body of said second leg,
  (8) the proximal section of the body of said second leg being located in a proximal plane of said second leg,
  (9) the distal section of the body of said second leg being located in a distal plane of said second leg,
  (10) the free end of the ninety-degree loop portion of said second leg being located in the distal plane of said second leg,
  (11) the distal plane of said first leg being co-planar with the distal plane of said second leg with the free end of said first leg being co-planar with the free end of said second leg,
  (12) a notch portion connecting the proximal end of the distal section of the body of said second leg to the distal end of the proximal section of the body of said second leg, and
  (13) the notch portion of said second leg being in a notch plane which is oriented at an oblique angle with respect to the proximal and distal planes of said second leg; and c) a torsion spring connecting the proximal end of the body of said first leg to the proximal end of the body of said second leg and which includes a heat treated coil which biases the proximal end of the body of said first leg toward the proximal end of the body of said second leg in an armed configuration of said one-piece monolithic body, said torsion spring being co-planar with the proximal planes of said first and second legs;

d) the notch portion of the body of said first leg being located to abuttingly engage the notch portion of the body of said second leg in the armed configuration of said one-piece monolithic body and being spaced apart from the notch portion of the body of said second leg in a triggered configuration of said one-piece monolithic body;

e) the ninety-degree loop section of said first leg and the ninety-degree loop section of said second leg being movable in the distal planes of said first and second legs from the armed configuration with the proximal end of the proximal section of the body of said first leg spaced apart from the proximal end of the proximal section of said second leg by an armed space and the ninety-degree loop section of said first leg curving away from the ninety-degree loop section of said second leg, and the barb on said first leg being spaced apart from the barb on said second leg by an armed spacing to the triggered configuration of said one-piece monolithic body with the proximal end of the proximal section of the body of said first leg spaced apart from the proximal end of the proximal section of said second leg by a triggered space, with the triggered space being less than the armed space and the barb on said first leg being spaced apart from the barb on said second leg by a triggered spacing with the triggered spacing between the barb on the first leg and the barb on the second leg being greater than the armed spacing between the barb on said first leg and the barb on said second leg with the ninety-degree loop section on said first leg curving away from the ninety-degree loop section on said second leg; and f) said one-piece monolithic body being held in the armed configuration against the bias of the coil of said torsion spring by the abutting engagement between the notch portion on the body of said first leg and the notch portion on the body of said second leg and moving from the armed configuration to the triggered configuration after the notch portion on the body of said first leg is moved out of the abutting contact with the notch portion on the body of said second leg and under the influence of the coil of said torsion spring.

* * * * *